United States Patent Office 3,169,876
Patented Feb. 16, 1965

3,169,876
PROCESS FOR PRODUCING DEHYDRATED
SWEET POTATO FLAKES
Maurice W. Hoover, Raleigh, N.C., assignor to North Carolina State College of the University of North Carolina as represented by the business manager
No Drawing. Filed Mar. 22, 1962, Ser. No. 181,786
5 Claims. (Cl. 99—207)

The present invention relates to a process for producing a superior quality dehydrated sweet potato, *Ipomoea batatas*, flake or granule by the use of an enzymatic starch conversion technique and a color preservative to prevent discoloration of the finished product.

Sweet potato flakes are produced by dehydrating the cooked puree or mashed sweet potato on a drum dryer after it has been prepared by the conventional steps of peeling, trimming, cooking in water or steam, and pulping or screening to break up large particles and to remove fiber or other undesirable materials. Up to and including the pulping or screening step, the procedure for producing sweet potato puree is very similar, whether it is to be subsequently preserved by canning, freezing or dehydration.

A critical problem associated with the production of sweet potato flakes or granules from uncured and/or starchy roots is the high starch content in relation to the amount of sugar and other soluble solids present. When sweet potato puree containing a high starch-to-sugar ratio is dried on a drum dryer, the puree fails to stick properly to the drums and the resulting product is a very thin, porous, lacy sheet with a low bulk density. By proper control of the starch-to-sugar or starch-to-soluble solids ratio in sweet potato puree through enzymatic starch conversion, a finished dehydrated product of superior quality can be produced with greater efficiency and with improved flavor and handling characteristics.

Another problem associated with the production of sweet potato flakes is the occurrence of discoloration or darkening of the material before and after the product has been dehydrated. The amount of darkening varies with variety of the roots as well as with storage and other environmental factors to which they have been subjected prior to processing. Considerable research efforts have been devoted to finding some means of preventing the occurrence of discoloration in processed sweet potato products. However, until the present invention no practical and effective method was devised to prevent the discoloration in processed sweet potato products.

The procedure described herein for retaining the natural color, improving the flavor and texture of dehydrated sweet potato flakes and products made from flakes is also effective in preventing discoloration, improving flavor and texture of sweet potato puree or mashed sweet potato that is to be subsequently preserved by canning or freezing.

Another problem associated with the manufacture of sweet potato flakes is that of shelf life of the finished product after it is packaged. Flakes that are more dense and have less surface exposure to air have a longer storage life than the lighter more porous ones. Laboratory studies indicate that shelf life of flakes can be extended to some degree by the use of sequestering agents that sequester the heavy metals and thus make them unavailable for the oxidative reaction which causes a rancid flavor. The pyrophosphates used in the process of the invention act as sequestering agents. The enzymatic starch conversion technique described herein produces a more dense and less porous flake.

With the aforementioned problems associated with the manufacture of sweet potato flakes or granules in mind, it is an object of the present invention to provide a high quality dehydrated sweet potato flake or granule from uncured and/or starchy roots that contains a higher than normal sugar content and possesses an improved flavor, texture and color by supplementing the naturally occurring saccharifying enzymes present in the sweet potato with additional amylase from other sources along with the addition of a color preservative consisting of sodium acid pyrophosphate and tetra sodium pyrophosphate.

Another object is to provide a process whereby the natural color of the processed product can be preserved by preventing the occurrence of discoloration through the use of sodium acid pyrophosphate and tetra sodium pyrophosphate as a color preservative.

Another object is to provide a process whereby the dehydrated flakes produced from uncured and/or starchy roots can be dried with greater efficiency on a drum dryer.

Another object is to provide a process whereby the starch-sugar ratio can be readily controlled to the desired level by utilizing the natural amylase system in the roots of sweet potatoes plus the addition of a commercial mixture of alpha and beta amylase obtained from other sources to the puree.

Still another object is to provide a process whereby the bulk density of the dehydrated sweet potato flake or granule is increased through the control of the starch-soluble solids ratio by enzyme hydrolysis of the excess starch.

Another object is to control the pH of the finished product which affects the flavor, and also to prevent discoloration by the use of a mixture of sodium acid pyrophosphate and tetra sodium pyrophosphate in the proper proportions. The ratio of sodium acid pyrophosphate to tetra sodium pyrophosphate in the mixture is preferably 3:1, respectively. Sodium tripolyphosphate may be substituted for tetra sodium pyrophosphate in the mixture to obtain similar results.

Still another object is to provide a process whereby the shelf life of sweet potato flakes or granules is increased through the production of a heavier, firmer, less porous product that presents less surface exposure to the oxygen of the air. This in turn retards oxidation and the development of off flavors. The phosphates sequester the heavy metals which apparently would normally enter into the oxidative rancidity reaction. The retarded development of off flavors in the flakes during storage is caused apparently by an additive effect resulting from the more dense, less porous flake and the sequestering of the heavy metals which prevents them from entering into the oxidative reaction.

Briefly stated, the process of the present invention comprises first the conventional processing technique known to the prior art of peeling the sweet potato roots, trimming, cooking in water or steam at atmospheric pressure or higher and pulping through a screen with openings ranging from 0.033 to 0.090 inch to break up the large particles and to remove excessive fiber and other undesirable matter. Sodium acid pyrophosphate or a mixture of sodium acid pyrophosphate and tetra sodium pyrophosphate (generally 3 parts sodium acid pyrophosphate to 1 part tetra sodium pyrophosphate) is added to the cooked sweet potatoes or puree at the rate of 0.05 to 0.8 percent on a dry weight basis. Sodium acid pyrophosphate is slightly more effective than tetra sodium pyrophosphate for controlling discoloration in sweet potato products; however, when concentrations of sodium acid pyrophosphate higher than about 0.2 percent on a dry weight basis are used, the pH of the product is lowered to the point where the finished product has an acid flavor. Although, tetra sodium pyrophosphate is not quite as effective in controlling discoloration as the acid form, it serves a dual purpose of helping control the pH of the finished product and at the same time contributes to the preservation of color. The phosphate color preservatives can be added at any time during the manufacturing of sweet potato flakes. However, results indicate that the preservatives should be added and mixed with the product after the roots are cooked.

After the cooked roots are pulped, a portion of the puree is cooled to a temperature ranging from 110 to 170° F., but generally 130° F. Saccharifying enzymes (alpha and beta amylase) are added to the puree at a concentration of 0.01 to 0.2 percent based on the weight of the puree. The conversion time required after the enzymes are added generally ranges from 10 to 120 minutes depending upon the starch content, enzyme concentration and temperature of the puree which preferably is maintained at a temperature of from 125–140° F. Since it is difficult to closely control the enzyme action, best results are obtained when only a portion of the puree to be dried is treated with the enzymes and the reaction is allowed to go to at least 90 percent completion in the treated portion. The treated and non-treated puree is then recombined into the desired proportions prior to drying on the drum dryer. Almost or complete saccharification of the starch in the treated puree is allowed to occur prior to adding it back to the untreated puree. The amount of "add back" or treated puree added back to the untreated material depends upon the starch-to-sugar ratio of the non-treated puree. The amount of enzyme treated puree added back to the untreated material generally ranges between 10 and 60 percent of the total amount of puree going to the drum dryer. It is desirable but not absolutely necessary under all conditions to raise the temperature of the enzyme treated puree to above 190° F. prior to mixing with the untreated material in order to inactivate the enzymes. In the flaking operation, the temperature of the puree reached on the drums is sufficient to inactivate the enzymes.

The mixture of treated puree and untreated puree is then preferably dried on a drum dryer operated with a steam pressure between 65 and 90 p.s.i. The mixture is preferably dried until a flake having a water content of from 2–4% by weight, based on the total weight of the dehydrated product, has been produced.

There are a number of suitable saccharifying enzyme preparations available commercially that will provide the desired conversion characteristics.

Other variations or modifications of the procedure described above are possible without departing from the scope of this invention.

As one example of the present process, a batch of sweet potatoes of the Nugget variety was peeled for one minute in a steam peeler with a steam pressure of 100 p.s.i. The peeled roots were then washed, trimmed, cut into slices ¾ inch thick and cooked in steam for 25 minutes at atmospheric pressure. A mixture containing 3 parts sodium acid pyrophosphate and 1 part tetra sodium pyrophosphate was added to the cooked potatoes at the rate of 0.3 percent based on the dry solids of the sweet potatoes. The cooked product was mashed or pulped through a screen containing 0.06 inch openings. The puree was then pumped into two stainless steel tanks. One of the tanks served as a conversion tank to which the puree and saccharifying enzymes were added, the other stainless steel tank was used for the non-treated portion. The sweet potato puree to be treated was pumped through a heat exchanger where it was cooled to approximately 130° F. prior to entering the treating tank. The enzymes were added to the 130° F. puree in the conversion tank at the rate of 0.05 percent based on the weight of the puree. After 30 minutes the enzyme treated puree was pumped through a second heat exchanger where the temperature was raised to 200° F. in order to inactivate the enzymes prior to recombining the treated and non-treated puree in the desired proportions. The two portions, treated and non-treated puree, were recombined at a ratio of 1 to 1 by weight. The puree was then dehydrated to 2 percent moisture on a drum dryer with 75 p.s.i. steam pressure in the drums. The sheet of dried product was broken and ground into flakes or granules. The dehydrated sweet potato flakes or granules were packaged and sealed in cans under nitrogen in order to stabilize or preserve the flavor of the product during extended shelf life.

Having described my process for producing sweet potato flakes and the method for practicing same, what I claim as my invention is:

1. The process for producing sweet potato flakes having improved flavor and storage stability comprising:
    (1) reducing the sweet potato to a puree;
    (2) separating the puree into a first portion and a second portion;
    (3) treating said first portion of said puree with a saccharifying enzyme at a temperature of from 110–170° F. to hydrolyze at least 90% of the starch therein;
    (4) combining the said first treated portion with said second untreated portion of said puree in an amount of from 10–60% by weight, based on the total weight of said first and second portions; and
    (5) dehydrating the same to a moisture content of from about 2% to about 4% and grinding the resultant dehydrated product to form the desired particle size.

2. The process of claim 1 in which the said first portion is treated with an enzyme selected from the group consisting of alpha and beta amylase for 10 to 120 minutes at 125–140° F.

3. The process for producing sweet potato flakes having improved flavor and storage stability comprising:
    (1) reducing the sweet potato to a puree;
    (2) treating the said puree with a color preservative comprising a mixture of sodium acid pyrophosphate and tetra sodium pyrophosphate in a parts by weight ratio of 3:1;
    (3) separating the puree into a first portion and a second portion;
    (4) treating said first portion of said puree with a saccharifying enzyme at a temperature of from 110–170° F. to hydrolyze at least 90% of the starch therein;
    (5) combining the said first treated portion with said second untreated portion of said puree in an amount of from 10–60% by weight, based on the total weight of said first and second portions; and
    (6) dehydrating the same to a moisture content of from about 2% to about 4% and grinding the resultant dehydrated product to form the desired particle size.

4. The process of claim 3 in which said color preservative is added in an amount of from 0.05 to 0.8%, based on the total dry weight of the treated puree, to provide a product having a pH in the range of from about 5.75 to about 6.3.

5. The process of claim 3 in which the said first portion is treated with an enzyme selected from the group consisting of alpha and beta amylase for 10 to 120 minutes at 125–140° F.

References Cited by the Examiner

UNITED STATES PATENTS

| | | | |
|---|---|---|---|
| 2,598,838 | 6/52 | Schermerhorn et al. | 99—207 |
| 2,784,094 | 3/57 | Sives | 99—207 |
| 3,027,258 | 3/62 | Markakis et al. | 99—207 |
| 3,027,264 | 3/62 | Irmiter et al. | 99—207 |

A. LOUIS MONACELL, *Primary Examiner.*

HYMAN LORD, *Examiner.*